(12) United States Patent
Szolusha et al.

(10) Patent No.: US 9,072,147 B2
(45) Date of Patent: *Jun. 30, 2015

(54) PRE-CHARGING INDUCTOR IN SWITCHING CONVERTER TO ACHIEVE HIGH PWM DIMMING RATIO IN LED DRIVERS

(71) Applicant: Linear Technology Corporation, Milpitas, CA (US)

(72) Inventors: Keith D. Szolusha, Saratoga, CA (US); Joshua W. Caldwell, Los Gatos, CA (US); Bryan Legates, Los Altos, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/264,518

(22) Filed: Apr. 29, 2014

(65) Prior Publication Data

US 2015/0145439 A1 May 28, 2015

Related U.S. Application Data

(60) Provisional application No. 61/909,685, filed on Nov. 27, 2013, provisional application No. 61/909,784, filed on Nov. 27, 2013.

(51) Int. Cl.
*H05B 33/08* (2006.01)
*H05B 41/28* (2006.01)

(52) U.S. Cl.
CPC ........ *H05B 33/0851* (2013.01); *H05B 33/0809* (2013.01); *H05B 33/0815* (2013.01); *H05B 41/28* (2013.01)

(58) Field of Classification Search
USPC ...... 315/247, 224, 225, 209 R, 291, 307–326
See application file for complete search history.

(56) References Cited

U.S. PATENT DOCUMENTS

| 8,294,388 B2 | 10/2012 | Wong et al. |
| 8,975,831 B1 * | 3/2015 | Szolusha et al. .............. 315/291 |
| 2007/0001620 A1 | 1/2007 | Lee et al. |

FOREIGN PATENT DOCUMENTS

DE 102013211767 A1 12/2013

OTHER PUBLICATIONS

EPO PCT/US2014/053141, "International Search Report and Written Opinion", dated Feb. 24, 2015, 7 pages.
Linear Technology Corporation Datasheet, "LT3743: High Current Synchronous Step-Down LED Driver with Three-State Control", 2009.

* cited by examiner

*Primary Examiner* — Tuyet Vo
(74) *Attorney, Agent, or Firm* — Patent Law Group LLP; Brian D. Ogonowsky

(57) ABSTRACT

In a method for controlling a current regulator for dimming an LED load, a dimming signal has a duty cycle that controls the LED ON-time and LED OFF time at a fixed frequency. The regulator is controlled by the dimming signal to only supply current to the LED load during the LED ON-time. The regulator includes an inductor. The inductor current at the end of an ON-time is detected and its value is stored. During the OFF-time, the inductor is pre-charged to the current level matching the stored value, while the regulator's feedback loop is frozen during the OFF-time to not change its feedback control signal. Upon the next ON-time, the regulator begins supplying current to the LED load with the pre-charged inductor current, so there is no initial decrease in the delivered LED current. Therefore, the current pulse magnitudes are constant even with very low duty cycles.

23 Claims, 9 Drawing Sheets

PRE-CHARGING INDUCTOR IN SWITCHING CONVERTER TO ACHIEVE HIGH PWM DIMMING RATIO IN LED DRIVERS

CROSS-REFERENCE TO RELATED APPLICATIONS

This application claims priority from U.S. provisional application Ser. No. 61/909,685, filed Nov. 27, 2013, and from U.S. provisional application Ser. No. 61/909,784, filed Nov. 27, 2013, both applications being by Keith Szolusha et al., assigned to the present assignee, and incorporated herein by reference.

FIELD OF THE INVENTION

This invention relates to pulse width modulation (PWM) dimming of light emitting diodes (LEDs) by controlling a switching regulator to supply modulated current pulses to the LED load and, in particular, to a pre-charging technique for pre-charging the regulator's inductor before the LED ON-time occurs to achieve extremely small dimming duty cycles.

BACKGROUND

The perceived brightness of LEDs can be dimmed by using a PWM dimmer to control the duty cycle of constant-magnitude current pulses to the LEDs. The PWM frequency is above the frequency that flicker can be perceived, such as above 60 Hz and commonly 100-1 KHz. The ideal current per pulse is that current which provides optimal operation of the LEDs.

The LED's peak wavelength and efficiency change with driving current. For example, with GaN LEDs, there is a blue shift as the current increases. Therefore, it is desirable for the current per pulse to be a constant target current throughout the entire pulse. The current is typically supplied by a switching regulator that switches at a frequency (e.g., >100 kHz) much higher than the PWM dimming frequency, so many regulator switching pulses occur during a single PWM dimming ON-time. Such high frequency pulses are smoothed by an output capacitor so the current through the LEDs is essentially a direct current for the duration of the pulse.

The switching regulator receives feedback from the sensed LED current to generate the target current during an ON-time of the PWM dimming pulse. Basically, when the PWM dimming controller generates an ON pulse, the regulator starts up to generate the target current and, simultaneously, the LED load is connected to draw current from the regulator. When the PWM dimming controller terminates the ON pulse, the regulator stops operating, and the LED load is either disconnected from ground or disconnected from the regulator to stop drawing current from the regulator's output capacitor. During the OFF-time, the regulator's inductor current typically drops to zero.

One problem with such a typical PWM dimming system is that, upon the rising edge of the PWM dimming ON pulse, when the regulator starts up and the LED load begins to draw current, there is an immediate surge of current into the LED load from the output capacitor. This reduction of charge in the output capacitor, without the regulator having time to replenish the charge, rapidly lowers the output current of the regulator, and, in turn, has an effect on the feedback (the sensed LED current) to the regulator. Thus there is a transient, and some time is taken in order for the regulator to achieve a steady state current output to the LEDs during the current pulse. This initial current ramp-up delay into the LEDs is due to the current ramping through the regulator's inductor starting from zero current at the onset of a PWM dimmer ON-time. The regular may take many switching cycles, such as greater than 20, until the current delivered from the inductor equals the target direct current through the LEDs (i.e., until steady-state is reached). The LED's perceived brightness (and to a lesser degree the peak wavelength) is determined by both the magnitude of the direct current supplied by the regulator during the PWM ON-time and the duty cycle of the ON pulses. Therefore, it is important that the regulator achieve steady-state as soon as possible after the PWM ON pulse is asserted.

The number of switching cycles needed by the regulator to achieve the target direct current depends on the voltage across the inductor (e.g., the difference between the input voltage and the output voltage in a buck regulator), the inductor value, the starting current through the inductor, the target direct current, the switching frequency, and other factors. Since the regulator requires a number of switching cycles (e.g., greater than 20 cycles) before reaching the steady state direct current, the minimum ON-time of the PWM ON pulse is limited. A human should not perceive any color shift with different PWM dimming duty cycles, so the minimum ON-time should be sufficiently long to cause the LEDs to generate the same peak wavelength during a vast majority of the PWM dimmer ON-time. This may limit the minimum ON-time to a 10% duty cycle or more. As an example, if a 100 kHz switching regulator takes 20 cycles (2×10E-4 sec.) to ramp up the inductor current to the target inductor current, this time is equal to the ON-time of a 2% duty cycle in a 100 Hz PWM dimmer. Therefore, with the 2% duty cycle, the smoothed current pulse to the LEDs is less than the target LED current. Since the human perception of brightness is logarithmic, the 2% minimum duty cycle is significant if the user desires a very dim light. Additionally, since the brightness and impedance of LEDs (being forward biased diodes) is also not a linear function of the current, any current less than the target direct current may cause the LEDs to not illuminate at all, resulting in the LEDs being completely off at duty cycles less than 2%.

One solution to this problem is described in U.S. Pat. No. 8,294,388, which is intended to reduce audible noise from the regulator's output capacitor when the LED load initially draws current from the capacitor when the PWM dimmer ON pulse is generated. The circuitry described in that patent senses the PWM ON pulse and delays applying it to the regulator. Upon sensing the PWM ON pulse, the system pre-charges the inductor to some current level that has been calculated based upon the input voltage, the output voltage, and the inductor value. After the desired pre-charge current level is reached, the regulator is controlled to begin operating and the LED load draws current for the remainder of the PWM dimmer ON-time. However, during the delay time when the inductor is pre-charging up from a low current level, the output capacitor is discharging into the inductor, so its voltage is lower than the voltage needed to supply the target current to the LED load. When the inductor current reaches its target pre-charge level, the regulator begins to operate and the LED load begins to draw current. However, at this time, the capacitor voltage is still below the steady-state level it was at when the previous PWM dimmer ON-time ended, resulting in the current to the LED load to be initially low. Thus, the regulator's feedback loop must correct for the initial drop in output voltage, and the regulator must then take multiple switching cycles to achieve steady state. Due to the added time it takes for the prior art regulator to achieve steady-state, the minimum PWM duty cycle achievable is still limited, and the user cannot fully control the dimming of the LED brightness down to low levels.

Additionally, the prior art system must calculate the optimal pre-charge current level of the inductor using the measured input voltage and output voltage, and other parameters. This precision measurement becomes complex, and the optimal pre-charge level will not be achieved, especially in a boost converter.

Additionally, the prior art patent does not mention delaying the dimmer ON pulse falling edge (applied to the regulator) by the same amount the ON pulse rising edge was delayed. This is especially problematic at very low duty cycles when the ON pulse is short, since the dimming becomes progressively non-proportional.

Additionally, by delaying the dimmer ON-pulse, synchronization of the regulator operation with other circuitry using the original PWM dimmer signal is much more difficult, or not possible.

What is needed is a technique to control the dimming of LEDs driven by a switching regulator that allows the PWM minimum duty cycle to approach zero to maximize the dimming ratio, while a substantially constant current is supplied to the LED load throughout the entire ON-time, without delaying the LED ON pulse from the original signal.

SUMMARY

The present invention pre-charges the inductor of a switching regulator in an LED PWM dimmer system, wherein the pre-charge allows the minimum ON-time of the LEDs to be as little as one switching cycle of the regulator, or less.

At the end of the PWM dimmer ON-time, the output capacitor of the regulator is electrically isolated from the regulator's inductor and load and prevented from supplying current to the LED load, so the capacitor voltage does not change during the OFF state nor during the pre-charge time of the inductor. An error voltage Ve (the state of the feedback loop) is also frozen during the PWM OFF time. This allows the feedback loop of the switching regulator to remain in steady-state during the OFF-time (including the time that the inductor is pre-charging).

In another embodiment applicable to certain types of regulators, no output capacitor Cout is used for smoothing the inductor current since the human eye does not perceive the small high frequency ripple in the LED load's 14 brightness. The brightness and peak wavelength of the LEDs are averaged over the ON-time.

Also at the end of the ON-time, a value that is directly proportional to the instantaneous and/or average current through the inductor is measured and stored, such as by a sample and hold circuit.

The dimmer PWM period is repetitive (e.g., 1/100 second) and thus the beginning of the ON-time is predictable. By measuring the previous cycle's OFF-time or the repetitive PWM period time, the beginning of the next cycle's ON-time can be predicted. Prior to the predicted start of the next ON-time, the inductor is pre-charged to exactly or approximately the current level it was at just prior to when the OFF state occurred. This can be done by comparing the pre-charge current to the stored instantaneous or average inductor current value. The pre-charge time is automatically adjusted to cause the pre-charge current to equal the stored instantaneous or average inductor current, or any other target pre-charge current.

The voltage at the output capacitor and the error voltage Ve are unaffected since these voltages are isolated during the OFF-time. When the leading edge of the PWM ON-time pulse is received, the regulator operation is initiated and the output capacitor can now receive current from the inductor and supply current to the LED load and Ve can resume adjusting the feedback loop dynamically. Therefore, at the rising edge of the PWM ON-time pulse, the regulator is at precisely the state it was in at the start of the previous OFF-time, and there is little or no change in the delivered current to the LED load throughout the ON-time. In other words, the current pulse to the LED load is substantially constant from the beginning of the PWM ON-time pulse to the end of the ON-time pulse.

Therefore, the dimming ON-time can be made very small and down to a single switching cycle of the regulator or less. Thus, augmenting a typical LED dimming system with the invention may allow the dimming ratio to be expanded, for example, from about 100:1 (1%) to greater than 20,000:1 (0.005%).

To ensure the LED load current at the end of the PWM ON-time matches a target LED load current, the pre-charge time is adjusted to cause the LED load current at the end of the ON-time to match the target LED load current. The target LED load current may be that current level needed to match the reference voltage at the input of the regulator's error amplifier. For very short ON-times, the LED load current at the end of the ON-time may be, for example, too low even though the pre-charge inductor current matches the stored inductor current at the end of PWM ON-time. At very low PWM duty cycles, there is a chance that the loop does not have time to react and properly regulate ILED to its programmed value. This may be the result of the duty cycle being less than a single switching cycle of the regulator. In such a case, the pre-charge circuit may overdrive the inductor prior to the ON-time, so that the pre-charge inductor current is higher than the instantaneous inductor current stored at the end of the previous ON-time, or regardless of what the inductor current level is. This pre-charge control takes precedence over matching the pre-charge current to the stored instantaneous inductor current, since it better achieves the goal of providing a target constant LED load current at very low duty cycles. If the ILED current is too high at the end of PWM ON-time, the ILED loop can reduce the pre-charge time to generate the proper ILED current. In general, ILED current should be properly regulated by the normal regulator feedback loop at the end of PWM ON-time for most PWM duty cycles that have longer ON-times than a several switching cycles (depending upon the bandwidth of the converter). This extra ILED pre-charge loop extends the linearity of the dimming ratio to very, very high ratios. When this ILED loop is not needed, it allows the inductor current comparator and loop to control the pre-charge time. However, when it is needed, it takes over the pre-charge time control loop.

Since the optimal pre-charge level is not calculated, but is based on a stored level just before the OFF-time, the pre-charge level can be precisely set to equal the stored level. However, it can optionally also be calculated.

The pre-charging technique can be applied to all types of switching regulators, such as boost, buck, buck-boost, flyback, etc.

Other embodiments are described in the detailed description.

BRIEF DESCRIPTION OF THE DRAWINGS

Elements that are similar or identical in the various figures are labeled with the same numeral.

DETAILED DESCRIPTION

Figure 1:
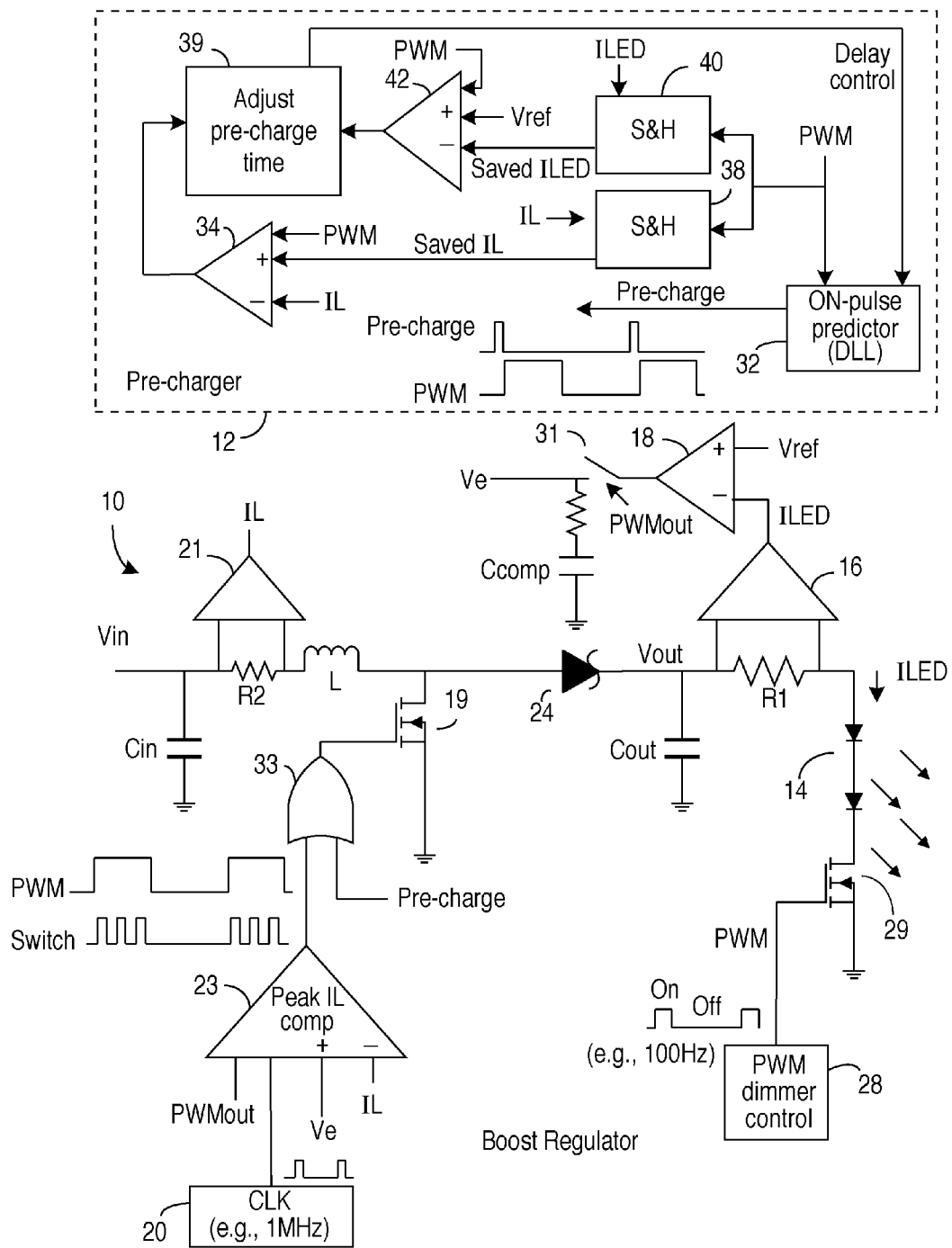
FIG. 1 illustrates a boost LED driver augmented with a PWM dimmer circuit and an inductor pre-charger circuit for pre-charging the inductor to approximately the steady state LED current prior to the PWM dimmer ON pulse.

FIG. 1 illustrates a boost regulator embodiment of the invention. The regulator boosts the input voltage Vin, filtered by the input capacitor Cin, to a higher voltage to drive an LED load. The regulator portion 10 of the circuit is conventional and need not be described in detail. Many variations of the boost regulator may be used, and FIG. 1 is just an example. The pre-charger circuit 12 contains the inventive aspects.

The general operation of the boost regulator is as follows. The regulator generates a target output current when in steady state. A substantially direct current is applied to the LED load 14 during the PWM dimming ON-time. This current is detected by the voltage across a low value sense resistor R1. A difference amplifier 16 generates a feedback voltage corresponding to the LED current ILED. This feedback voltage is applied to a transconductance error amplifier 18, which compares the feedback voltage to a reference voltage Vref. A compensation capacitor Ccomp is charged, discharged, or unchanged depending on how the feedback voltage compares with Vref. The resulting error voltage Ve sets the duty cycle of the switching MOSFET 19 so that the feedback loop matches the feedback voltage to Vref in steady state. This error voltage Ve terminal is typically identified as the voltage compensation Vc pin of the IC package, where the external capacitor Ccomp is connected. There may be slope compensation added to the Ve in the control loop to provide loop stability, as done in conventional switching regulators.

At the start of the regulator switching cycle, a clock 20 generates a pulse which resets the MOSFET 19 to turn it on. This causes a ramping current to flow through the inductor L and the resistor R2 to charge the inductor L. The ramping current creates a ramping IL signal at the output of the difference amplifier 21 that is compared to the error voltage Ve by a peak inductor current (peak IL) comparator 23. When the voltage levels cross, the MOSFET 19 is turned off. When the MOSFET 19 turns off, the increased voltage at the anode of the diode 24 forward biases the diode 24, and the inductor L discharges into the output capacitor Cout as the inductor current ramps down. The voltage of the capacitor Cout is that voltage needed to provide the target current ILED to the LEDs. The capacitor Cout smoothes the current supplied by the inductor L. The smoothed current supplied to the LED load 14 is the average of the inductor current supplied during the ON-time.

The switching frequency of the regulator is typically greater than 100 KHz, such as 1 MHz, to allow the use of smaller components.

A PWM dimmer control circuit 28 generates a PWM signal and may be controlled manually or by a processor to set the perceived brightness of the LEDs. Part of the circuit 28 may be internal to the IC to convert an externally-generated PWM signal or voltage to the required format and level for application to the circuitry in FIG. 1. The circuit 28 generates an ON-time pulse at a fixed frequency, such as 100 Hz. The duty cycle of the ON-time pulse determines the perceived brightness of the LEDs. A 100% duty cycle turns on the LEDs 100% of the cycle time. A 10% duty cycle causes the LEDs to be one-tenth as bright. The controlling of the duty cycle may be by any means, such as by manually controlling a variable resistance.

When PWM is high, a MOSFET 29 is turned on to create a current path to ground for the LED load 14 to illuminate the LEDs. The PWM signal is also applied to the peak IL comparator 23 so that, when the PWM signal is high, the switching of the MOSFET 19 is enabled, and, when the PWM signal is low, the MOSFET 19 is kept off (except during a pre-charge time described below). Since the switching frequency of the MOSFET 19 is much higher than that of the PWM signal, there will typically be many switching cycles of the regulator during an ON-time of the PWM signal.

The PWM signal also controls a switch 31 that couples the error amplifier 18 to the compensation capacitor Ccomp during the ON-time and decouples the error amplifier 18 from the capacitor Ccomp during the OFF-time, so that the detected zero LED current during the OFF-time does not affect the error voltage Ve during the OFF-time. Therefore, the feedback loop is frozen during the OFF-time. The error amplifier 18 can be a transconductance amplifier.

In conventional dimming systems, during the OFF-time of the regulator, the current through the inductor L drops to zero. Therefore, in such conventional systems, multiple switching cycles of the regulator are needed after the start of the ON-time to ramp up the inductor current to the required average steady-state current. This limits the minimum ON-time (or duty cycle) for dimming. Going below this minimum ON-time causes the brightness control to be highly non-linear and changes the color output of the LEDs. The pre-charger circuit 12 of the present invention avoids this problem.

By measuring the OFF-time or the PWM period, the present invention, through the pre-charger circuit 12, predictively starts charging the inductor L to approximately the current level that existed at the end of the previous PWM dimmer ON-time. As a result, the current pulse level to the LEDs will be substantially constant from the beginning to the end of the dimming ON-time, and the current pulses for high PWM dimming duty cycles and very low duty cycles will be substantially the same. Thus, there will be no color shifting at the low duty cycles, and the brightness of the LEDs will be accurately controlled down to one switching cycle of the regulator or less. Therefore, the dimming may be smoothly controlled from full brightness to substantially off. The operation of the pre-charger circuit 12 applies equally to all types of switching regulators, and the boost regulator is just one example.

The operation of the pre-charger circuit 12 is as follows.

Since the PWM dimming frequency is constant for any duty cycle, such as 100 Hz, the leading edge of the ON pulse occurs at a predicable time, which is exactly 1/100 of a second after the previous ON pulse leading edge. The PWM signal is applied to an ON-pulse predictor circuit 32, which triggers a timer at the leading edge of an ON pulse. The timer generates an enable signal a short time prior to the leading edge of the next ON pulse to initiate the pre-charging operation. This may be done in many ways, either digitally or using analog circuitry. The timer may be a phase-locked loop (PLL) or a delay locked loop (DLL) having a controllable delay. In one embodiment, a capacitor is charged to an initial voltage at the leading edge of the ON pulse and discharged at a predetermined constant rate. When the capacitor voltage goes below a threshold, sometime before the next ON pulse, a comparator is triggered to initiate the pre-charging of the inductor L. A digital timer may also be used that is out of sync with the dimmer clock by, for example, 1% to allow time for the pre-charging of the inductor L.

Thus, the predictor circuit 32 output (pre-charge) goes high slightly before the PWM signal goes high to enable the pre-charging of the inductor L. The output of the predictor circuit 32 (pre-charge) goes low at the leading edge of the PWM ON-time pulse to disable the pre-charge operation. As described below, the controllable delay between the ON-pulse output of the predictor circuit 32 and the ON-pulse of the PWM signal determines the inductor pre-charge current.

The high signal from the predictor circuit 32 is applied to an OR gate 33 along with the output of the peak IL comparator 23. The high signal turns on the MOSFET 19 to conduct a ramping current through the inductor L and the resistor R2. The output of the difference amplifier 21 is thus proportional to the instantaneous current IL through the inductor L. In another embodiment, the inductor winding itself acts as the sense resistor. It is preferred that the pre-charging of the inductor L be performed by a single ramp-up of current rather than a pulsed ramp-up at a high frequency. However, it could ramp up at the converter switching frequency with a high duty cycle.

The IL signal output from the difference amplifier 21 is applied to the inverting input of a difference amplifier 34 (which may be a comparator). An IL value stored by a sample and hold circuit 38 at the end of the previous ON-time is applied to the non-inverting input of the difference amplifier 34. The PWM signal is applied to the difference amplifier 34 to effectively enable the difference amplifier 34 only at the leading edge of the PWM ON-pulse. The output of the difference amplifier 34 thus determines whether the inductor pre-charge current at the beginning of an PWM ON-time matches the inductor current that existed at the end of the previous ON-time.

The output of the difference amplifier 34 is applied to an adjustment circuit 39. The adjustment circuit generates a delay control signal that is applied to the ON-pulse predictor circuit 32 (e.g., a delay locked loop) to continually control the delay between the start of the pre-charge time and the PWM ON-time so that the measured pre-charge current IL matches the stored IL current. If it is determined that the pre-charge current is too low, the adjustment circuit 39, for example, controls a delay element in the DLL to extend the pre-charge time for the next cycle until the inputs to the difference amplifier 34 match. If it is determined that the pre-charge current is too high, the adjustment circuit 39, for example, controls a delay element in the DLL to decrease the pre-charge time for the next cycle until the inputs to the difference amplifier 34 match. If the difference amplifier 34 outputs an analog value, the magnitude of the difference can be directly correlated to the required delay adjustment needed to match the values for the next cycle. If the difference amplifier 34 is a comparator, a few iterations may be needed to match the values. If the ON-pulse predictor circuit 32 uses a phase-locked loop, the delay control signal may adjust the output of a voltage controlled oscillator.

Thus, the state of the inductor L before the next ON-time is the same as, or approximately the same as, the state of the inductor at the end of the previous ON-time.

The sample and hold circuit 38 constantly monitors the inductor current IL and, at the falling edge of the PWM ON pulse, the existing inductor current IL level is stored (held). As described above, this inductor current IL value is then applied to the difference amplifier 34 so that the pre-charge time is adjusted to adaptively pre-charge the inductor L to the current level stored in the sample and hold circuit 38 at the point when the next PWM ON-time occurs. At the PWM ON event, pre-charging stops.

The diode 24 only becomes forward biased when the MOSFET is off, so the output capacitor Cout is essentially isolated during the pre-charge phase and retains its full charge. The diode 24 thus acts as an isolation circuit.

Thus, the regulator is at the same state it was in at the end of the previous ON-time, including the output capacitor Cout voltage and the error voltage Ve.

The pre-charge time ends at the PWM-ON event, when the pre-charge signal output from the ON-pulse predictor circuit 32 goes low and the PWM ON-time starts. When the PWM signal goes high, the peak inductor current comparator 23 is enabled to regulate the high frequency switching of the MOSFET 19, and the MOSFET 29 turns on to draw the regulated current ILED through the LED load 14.

In another embodiment, a dedicated pre-charge MOSFET is controlled by the pre-charge signal to conduct the pre-charge current though the inductor L, rather than using the regulator's switching MOSFET 19. The MOSFET may be connected in parallel with the MOSFET 19. By using a separate pre-charge MOSFET, the regulator portion can be completely independent from the pre-charger portion to simplify adding the pre-charger circuit to existing regulator designs.

The ILED at the end of the PWM ON-time should also be the correct ILED for all duty cycles. The ILED value is typically correctly regulated by the regulator portion 10 during normal steady-state operation. However, for short PWM ON-times, the regulator may not be able to regulate the ILED value to be the target value. Therefore, the pre-charge circuitry may also compare the actual ILED value at the end of the PWM ON-time to the target ILED. If it is not correct, the ON-pulse predictor circuit 32 is controlled to increase the pre-charge time to match the ILED at the end of the ON-time to the target ILED. This adjustment takes precedence over matching the pre-charge inductor current IL to the stored instantaneous inductor current IL, since the goal of the pre-charger circuit is to provide the correct ILED to the LED load. The measured ILED value is stored by a sample and hold circuit 40 at the trailing edge of the PWM signal (the end of the ON-time), and the held ILED value is applied to the inverting input of a difference amplifier 42. Vref is applied to the non-inverting input. Any difference between the detected ILED at the end of an ON-time and the target ILED (specified by Vref) is used to adjust the pre-charge time via the ON-pulse predictor circuit 32 so that the two values match.

The trailing edge of the PWM signal may be instead applied to the difference amplifier 42 to control the difference amplifier 42 to detect the difference between the actual ILED value and the target ILED value (specified by Vref) at the end of the PWM ON-time, so the sample and hold circuit 40 would then not be needed.

In another embodiment, as an additional assurance of ILED accuracy, the ILED at the beginning of a PWM ON-time can be compared to either the held ILED from the end of the previous PWM ON-time or Vref to further ensure that the beginning of the PWM ON-time ILED is the targeted ILED current.

In one embodiment, a target IL or ILED is set by the user, such as by using an external signal or components, and the feedback loop adjusts the pre-charging to achieve the target IL or ILED during the pre-charge time.

In one embodiment, the adjustment circuitry may be external to the IC and used for tweaking the final values of the IC during testing of the circuit at the fabrication facility to account for any non-ideal characteristics.

Instead of comparing the pre-charge current to the stored instantaneous inductor current at the previous ON-pulse falling edge, the pre-charge current through the inductor L may be matched to the stored steady-state average current, valley current, or peak current through the inductor or some percentage of these.

Accordingly, the current pulses to the LED load 14 have substantially the same magnitude from beginning to end, there is substantially no transients incurred in the feedback loop since the state of the feedback loop is frozen during the OFF-time and pre-charge time, and the PWM dimmer ON-time can be as little as a single switching cycle of the regulator or even less than a single switching cycle.

The regulator portion 10 and the pre-charger circuit 12 may be implemented as a single integrated circuit (IC). In one embodiment, the capacitors Cin and Cout and inductor L are not included on the IC due to their sizes, but those components may be included in the same package as the IC. Any portion of the dimmer controller may also be put on-chip or the chip may simply have an input pin for the PWM signal.

The IC could regulate the pre-charge time so that the inductor current rises to any of the following levels: 1) the average inductor current level during an ON-time; 2) a valley level during the ON-time; 3) the peak level during the ON-time; or 4) some percentage of any of the above (e.g., 90%).

In an alternative embodiment, rather than compare the pre-charge current to a stored inductor current, the desired pre-charge current can be calculated by circuitry within the IC or by an external circuit, such as a microprocessor, or set by the user using a pin of the IC. The desired pre-charge ramp-up time can be calculated by measuring the input voltage and the output voltage, then applying an algorithm to the values and to the various constants related to the circuit topology. In such a case, the inductor current and the ILED current do not need to be stored within the chip.

In the boost regulator of FIG. 1, the output capacitor Cout is inherently isolated from the inductor L during pre-charging by the diode 24, which may be a Schottky diode. A synchronous rectifier switch may be used instead and thus must be turned off during the pre-charging time. In other regulator configurations, such as for a buck regulator, where the output capacitor is normally directly connected to one end of the inductor, an isolation switch is added in series with the capacitor for preventing the capacitor from discharging into the inductor during the pre-charge period so that the output voltage remains frozen until the ON-time begins. The error voltage Ve is also prevented from changing until the next ON time so that feedback loop remains frozen until the ON-time begins.

In another embodiment applicable to certain types of regulators, no output capacitor Cout is used for smoothing the inductor current since the human eye does not perceive the small high frequency ripple in the LED load's 14 brightness. The brightness and peak wavelength of the LEDs are averaged over the ON-time.

Figure 2:
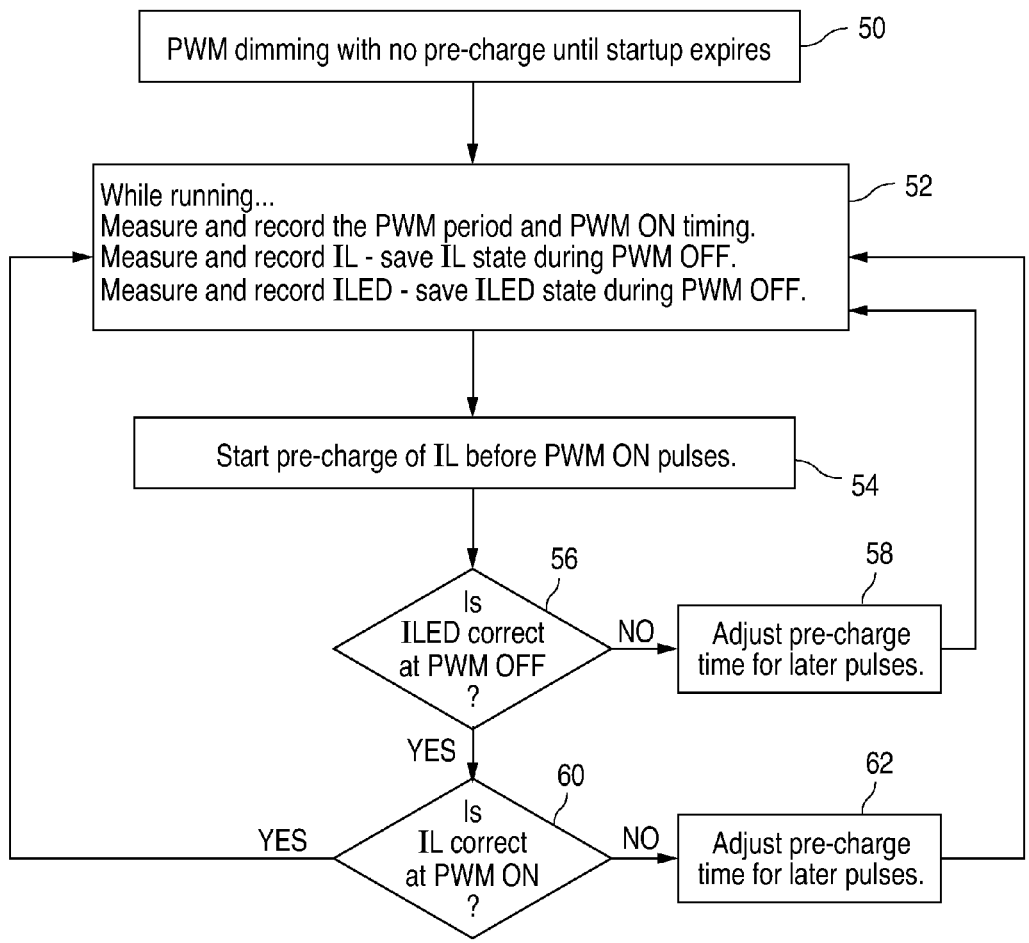
FIG. 2 is a flowchart of the operation of the circuit of FIG. 1.

FIG. 2 is a flowchart summarizing the pre-charging routine.

In step 50 of FIG. 2, the regulator is assumed to be starting up from an unpowered state, and the pre-charging circuit 12 is disabled until the regulator achieves its steady-state or until after starting timing has ended.

In step 52, it is assumed the regulator is at its steady-state or startup has ended and the PWM signal is applied to the IC to control the brightness of the LED load 14. For each dimming cycle, the ON-pulse predictor circuit 32 detects the PWM signal for its PWM period and PWM ON-timing, and enables the pre-charge routine shortly before the next ON pulse. The sample and hold circuits 38 and 40 save the instantaneous inductor current level IL and the direct current ILED level that existed at the end of the previous ON-time.

In step 54, the MOSFET 19 is controlled to pre-charge the inductor L, in a single pre-charge ramp, shortly prior to the next ON-time. The PWM signal then goes high to start the ON-time, which enables the regulator and causes current to be drawn through the LED load 14.

In step 56, a verification step is performed to ensure that the resulting direct current ILED through the LED load 14 at the end of the ON-time (or at any other desired time during the ON-time) matches the target ILED set by the converter. If the ILEDs do not match, the pre-charging time for subsequent pulses is adjusted (step 58), such as by changing voltage offsets, changing resistances, controlling a VCO, or any other parameter. This is especially important at very high dimming ratios. This may require pre-charging the inductor to greater than or less than the target inductor current.

In step 60, the pre-charge inductor current IL is optionally compared to the actual inductor current during the ON-time to determine if the pre-charge current was accurate. If there is a match, no adjustment needs to be made. If there is not a match, the pre-charging time for subsequent pulses is adjusted (step 62).

Figure 3:
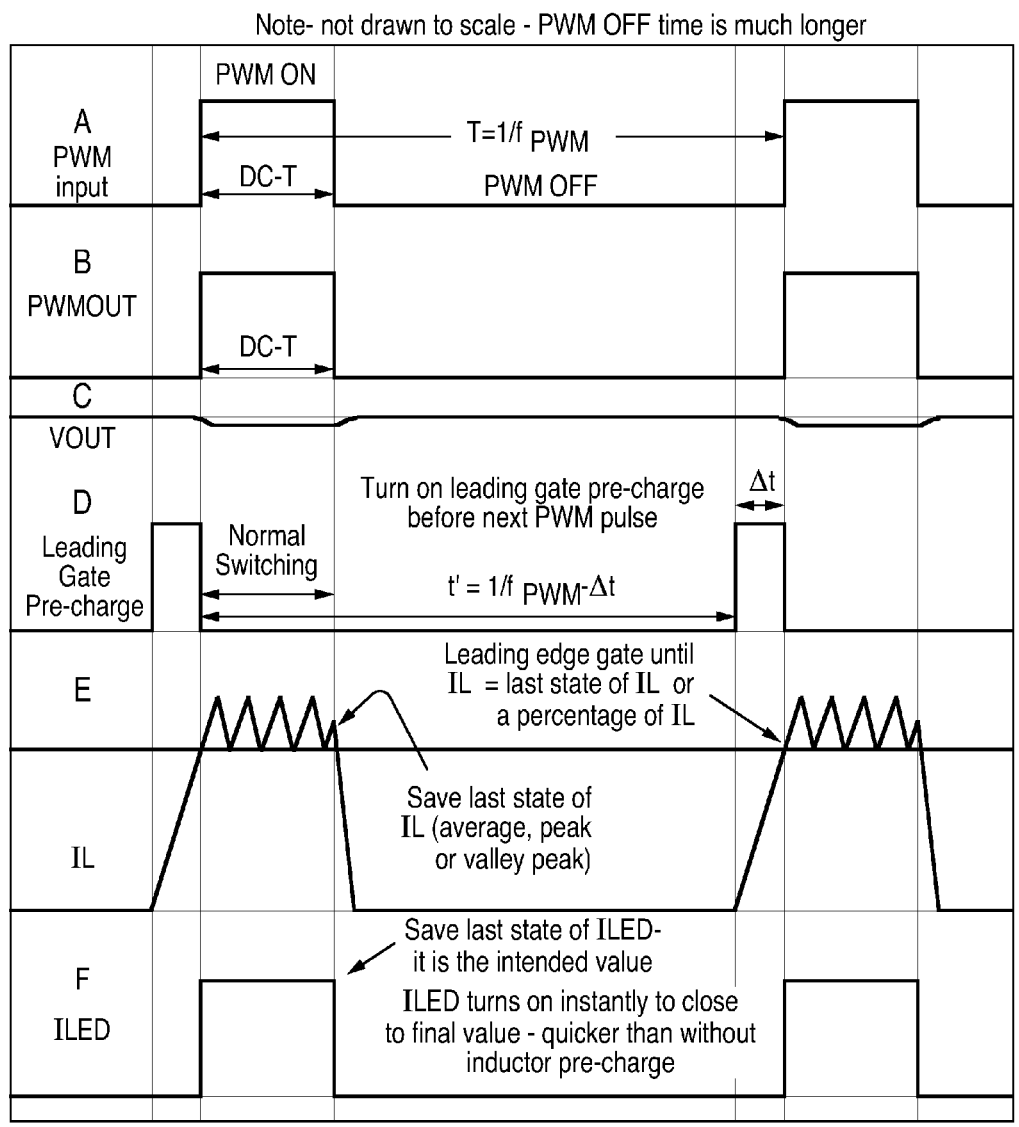
FIG. 3 illustrates various waveforms, where the PWM dimmer ON-time is longer than several switching cycles of the regulator.
Figure 4:
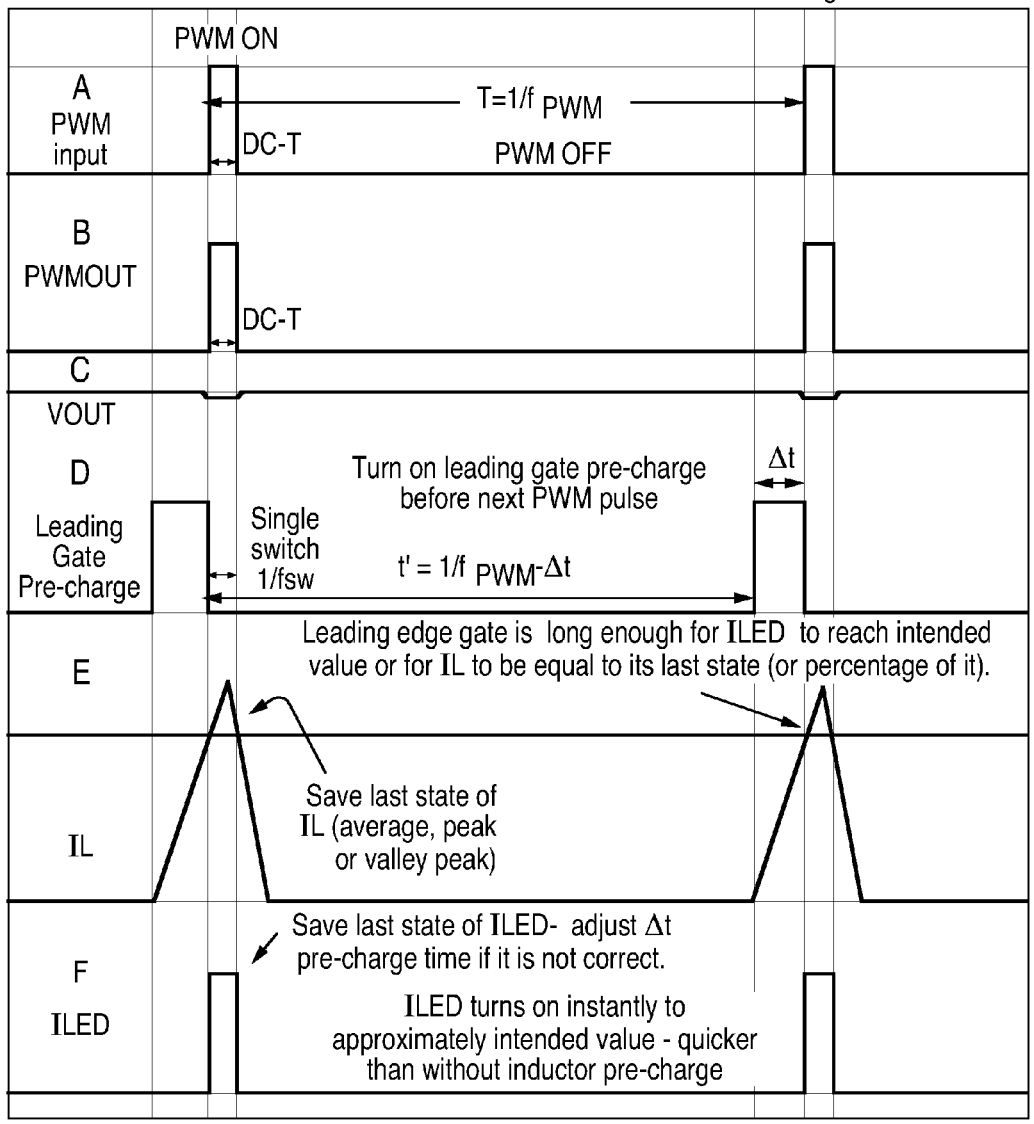
FIG. 4 illustrates various waveforms, where the PWM dimmer ON-time is approximately a single switching cycle of the regulator.

FIG. 3 illustrates various waveforms A-F, where the PWM dimmer ON-time is longer than several switching cycles of the regulator. FIG. 4 illustrates various waveforms A-F, where the PWM dimmer ON-time is approximately a single switching cycle of the regulator.

Waveform A of FIGS. 3 and 4 shows the externally generated PWM dimming signal applied to the IC of FIG. 1. The PWM signal is appropriately level shifted to generate the corresponding PWM signal (waveform B) internal to the IC that is applied to the internal components and to the MOSFET 29 connected between the LED load 14 and ground.

Waveform C illustrates the output capacitor Cout voltage Vout. Note how the voltage is substantially constant throughout the entire ON/OFF cycle. Although there is a very slight rise shown in Vout when the regulator is off, this is due to the inherent operation of the regulator, which may discharge inductive energy into Cout at the PWM OFF event after the LED load is disconnected. This slight rise does not necessarily happen in all embodiments.

Waveform D illustrates the gate control signal for the pre-charge MOSFET 32. The waveform D signal is applied shortly before the PWM ON-time pulse. The timing of the gate voltage can be controlled to achieve the target pre-charge current through the inductor L at the time of the next ON-time.

Waveform E illustrates the pre-charge current through the inductor (before the ON pulse) and illustrates the regulated current through the inductor during the ON-time. In the example, the inductor current was reduced to zero prior to the pre-charge time, then ramps up to the steady-state valley current of the inductor L. In another embodiment, the target pre-charge current could have been the average steady-state inductor current, the peak steady-state inductor current, or some percentage of any of these (peak, valley, average).

Waveform F illustrates the resulting smoothed current pulse applied to the LED load 14. The current pulse is substantially constant and the same level irrespective of the dimming duty cycle. In FIG. 4, the duty cycle is extremely small since the ON-time is about the same as a single switching cycle of the regulator.

Figure 5:
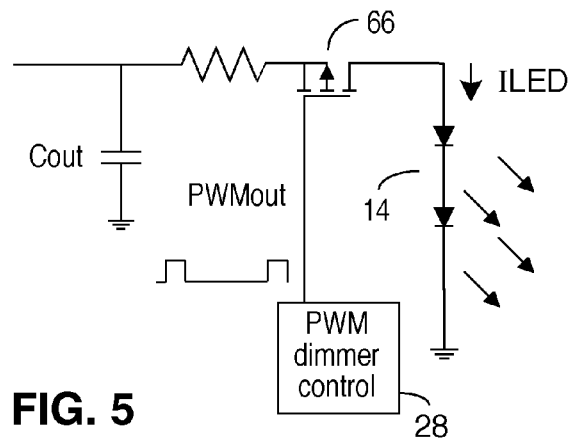
FIG. 5 illustrates a variation of the output portion of the boost LED driver of FIG. 1 where the LED load is disconnected from the regulator during the PWM OFF-time, rather than disconnected from ground.

FIG. 5 illustrates an alternative way of conducting current through the LED load 14 for PWM dimming. The PWM dimmer control circuit 28 controls the turning on and off of a P-channel MOSFET 66 connected in series between the regulator and the LED load 14. All other aspects of the system are the same as in FIG. 1.

Figure 6:
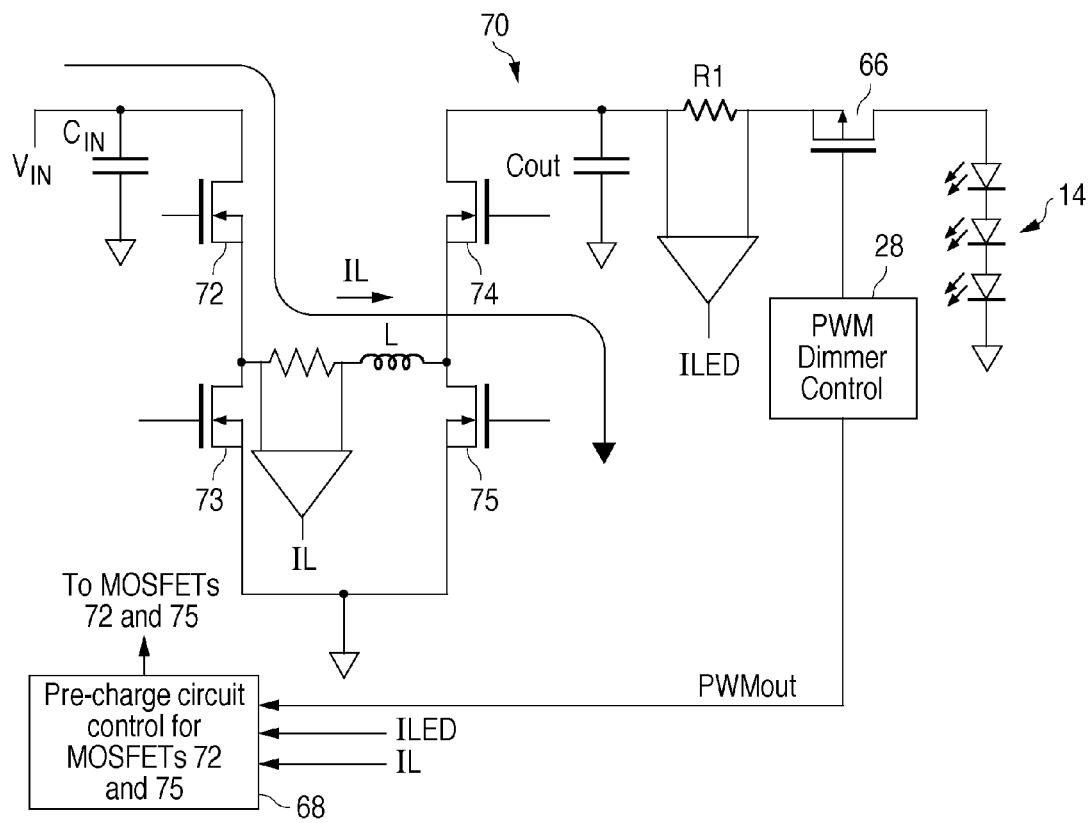
FIG. 6 illustrates the pre-charging circuit being applied to a 4-switch buck-boost LED driver.

FIG. 6 illustrates the pre-charger circuit 68 being applied to a 4-switch buck-boost regulator 70. In this example, instead of using a dedicated MOSFET for the pre-charging of the inductor L, the MOSFETs 72 and 75 are adaptively turned on prior to the PWM ON signal to draw a current through the inductor L until the current reaches a predetermined pre-charge level. This current level may be the same current level that existed at the end of the previous ON-time, or could be the valley current, the peak current, the average current, or a percentage of any of the average, peak, or valley currents. The MOSFETs 73 and 74 are off during the pre-charging. When the PWM-ON signal goes high to enable the regulator, it begins normal switching operation, and the MOSFET 66 is turned on to supply a current pulse to the LED load 14. At this time, the inductor pre-charge current should be at its target level, or pre-charge timing is adjusted. An increase in pre-charge time increases the current, and a decrease in pre-charge time decreases the current.

The regulator's normal operation is well-known. During an inductor charging period, the MOSFETs 72 and 75 are on and, during a discharging period, MOSFETs 73 and 74 are on. By regulating ILED, a feedback loop (not shown), similar to the feedback loop in FIG. 1, maintains the required voltage at the output capacitor Cout and Ve necessary to achieve the target current ILED through the LED load 14.

Figure 7:
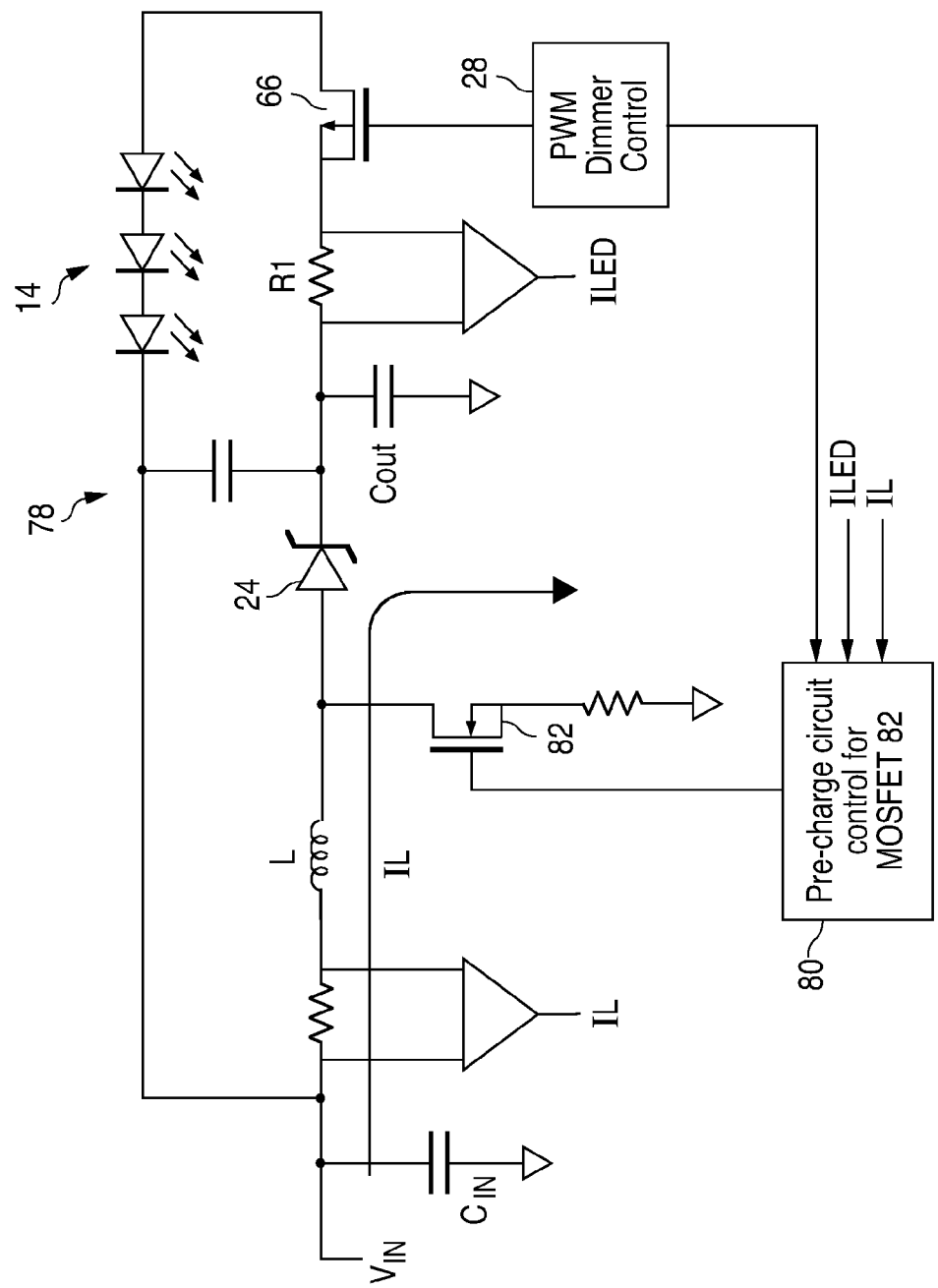
FIG. 7 illustrates the pre-charging circuit being applied to another type of buck-boost LED driver.

FIG. 7 illustrates another type of well-known buck-boost regulator 78 augmented with the pre-charger circuit 80. The MOSFET 82 is turned on prior to the PWM-ON pulse to pre-charge the inductor L to any of the pre-charge levels previously discussed. Alternatively, a dedicated pre-charge transistor (e.g., a MOSFET or other switch device) may be connected in parallel with the MOSFET 82. The LED load 14 is connected across the Vin terminal and the regulator output terminal. The regulator output terminal is a boosted voltage from the input as a direct result of regulating current through the LED string or strings. The pre-charging operation is similar to that described with respect to FIG. 1.

Figure 8:
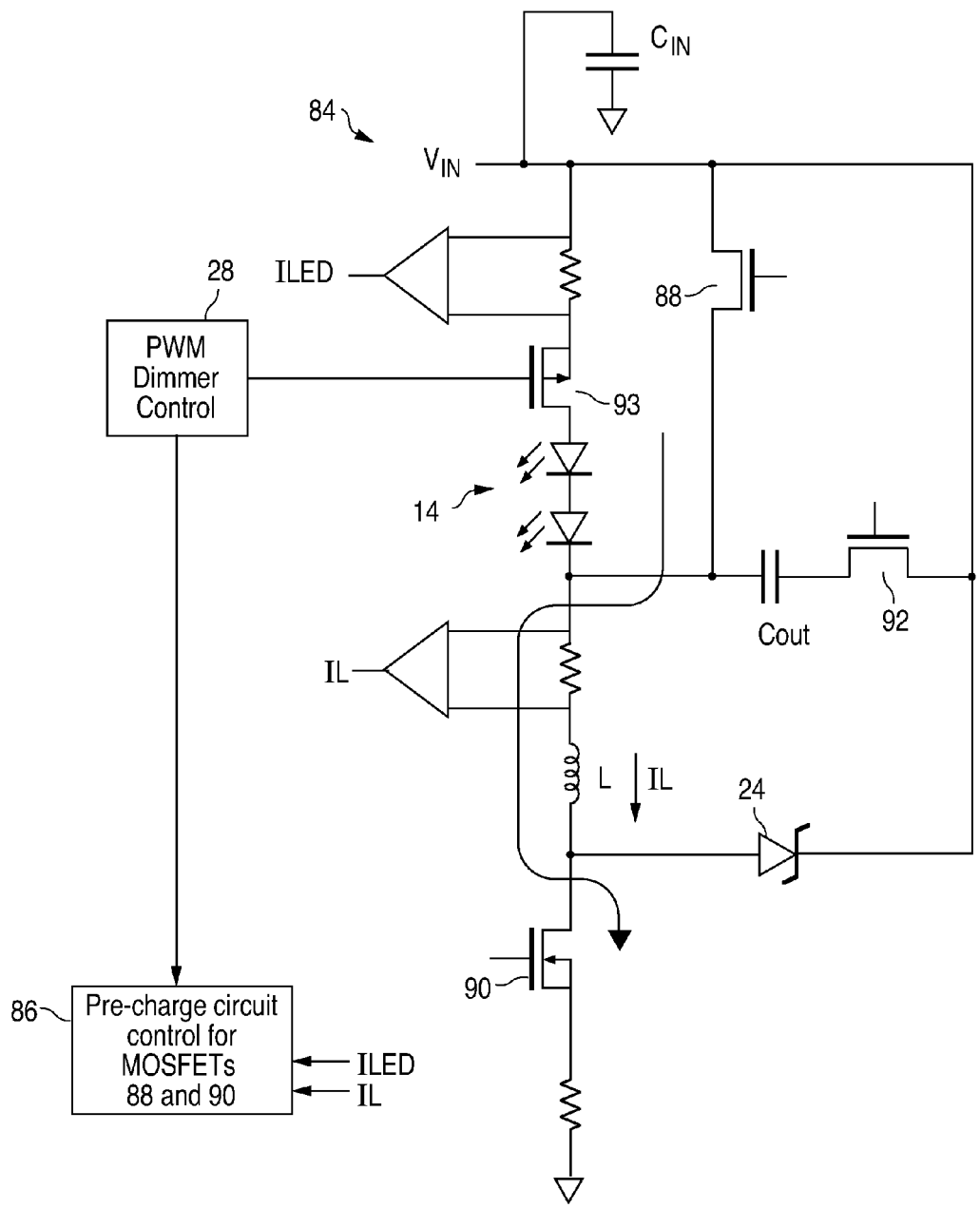
FIG. 8 illustrates the pre-charging circuit being applied to a buck LED driver.

FIG. 8 illustrates a well-known buck regulator 84 augmented with the pre-charger circuit 86. The MOSFETs 88 and 90 are turned on prior to the PWM-ON pulse to pre-charge the inductor L to any of the pre-charge levels previously discussed. During pre-charging, the MOSFETs 92 and 93 are turned off so that the output capacitor Cout is not drained during the pre-charging (the feedback loop, including Vout and Ve, is frozen during the entire dimmer OFF-time). The regulator 84 is controlled by feedback to supply a target current ILED through the LED load 14 that results in a voltage across the LED load 14 less than the input voltage Vin. The pre-charging operation is similar to that described with respect to FIG. 1.

Figure 9:
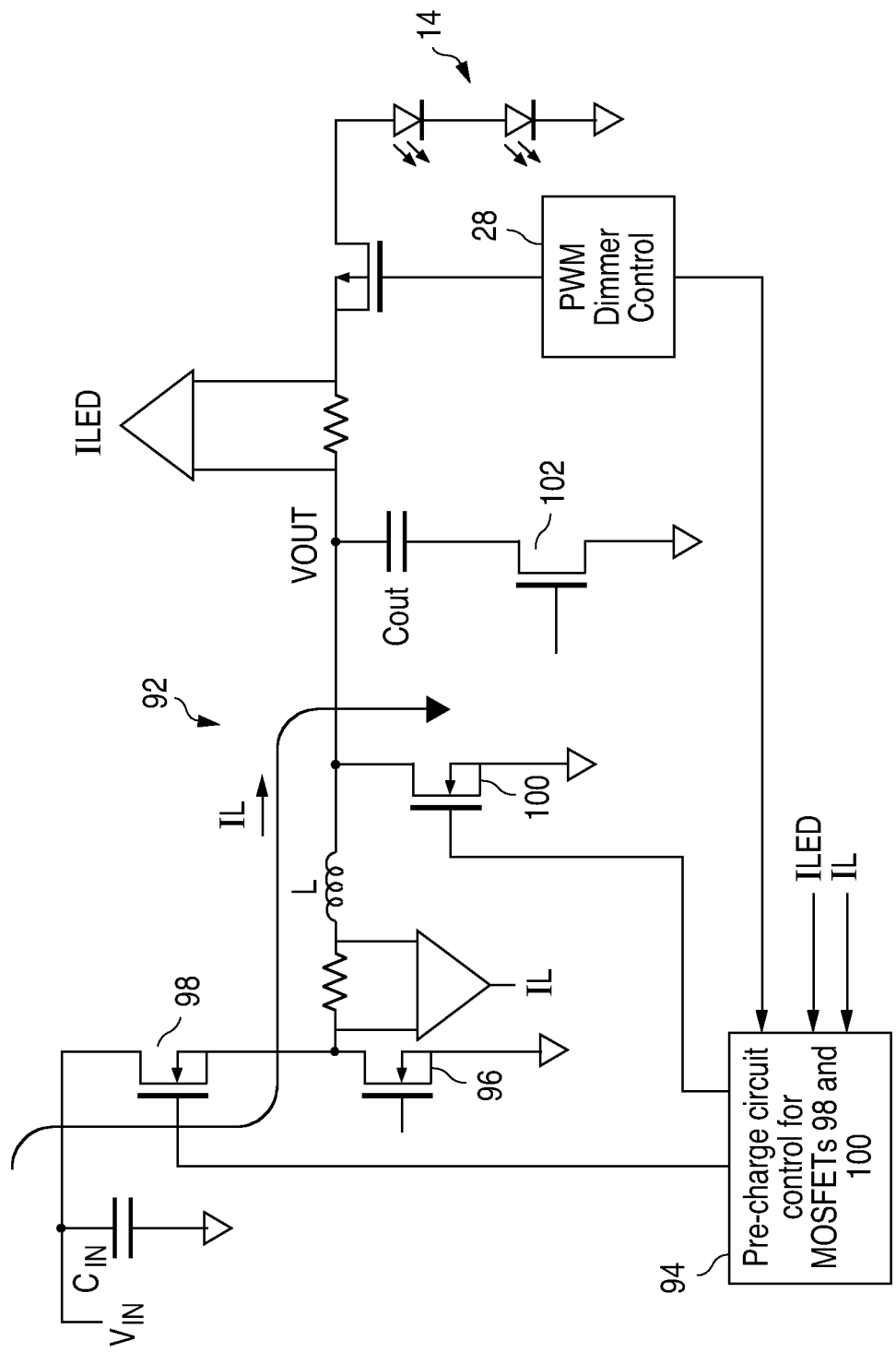
FIG. 9 illustrates the pre-charging circuit being applied to another type of buck LED driver.

FIG. 9 illustrates another type of well-known buck regulator 92 augmented with the pre-charger circuit 94. The regulator 92 uses a synchronous rectifier MOSFET 96 instead of a diode. The MOSFETs 98 and 100 are turned on prior to the PWM ON pulse to pre-charge the inductor L to any of the pre-charge levels previously discussed. A MOSFET 102 is turned off during the regulator OFF time so that the capacitor Cout is not discharged during the OFF-time. Also, the feedback loop (Vout and Ve) is frozen during the OFF-time.

During normal operation of the regulator 92, the MOSFET 98 is turned on to charge the inductor L, and the MOSFET 96 is turned on to discharge the inductor L. The regulator is controlled by feedback to supply a target current ILED through the LED load 14 that results in a voltage across the LED load 14 less than the input voltage. The pre-charging operation is similar to that described with respect to FIG. 1.

Figure 10:
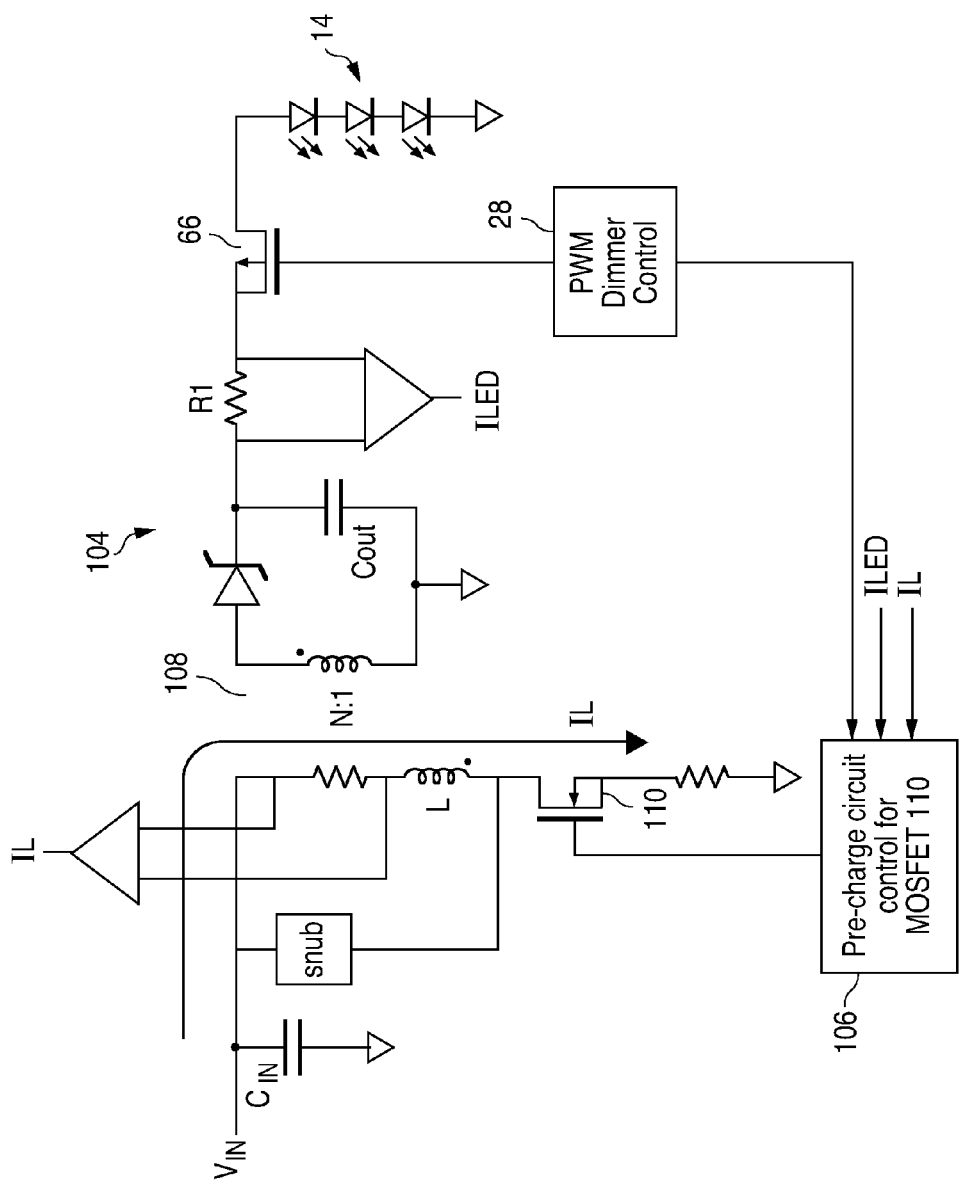
FIG. 10 illustrates the pre-charging circuit being applied to a flyback LED driver.

FIG. 10 illustrates a well-known flyback regulator 104 augmented with the pre-charger circuit 106. A transformer 108 is used for isolation, and the feedback signals into the pre-charger circuit 106 may be isolated or non-isolated. The MOSFET 110 is turned on prior to the PWM-ON pulse to pre-charge the inductor L to any of the pre-charge levels previously discussed.

The pre-charging operation is similar to that described with respect to FIG. 1.

For all embodiments, the on-resistance (Rds) of the pre-charge MOSFET can be used instead of a sense resistor to determine the current through the inductor.

Instead of the detected current signal for IL being stored and compared to the IL signal at the beginning of the ON-time, the error voltage Ve output of an error amplifier (e.g., amplifier 18 in FIG. 1) can be used to determine the level of IL.

As previously mentioned, the peak inductor current during the ON-time of the regulator can be used to determine the required pre-charge current. This peak current can be derived from the time that the switching transistor is on, rather than having to directly measure the peak current using a sense resistor.

The current sampling may need to be filtered for very low PWM dimming duty cycles at the beginning of PWM ON if there is ringing of the current due to the use of long cables.

If a very low dimming duty cycle does not allow the regulator to achieve the desired target current through the LED load, the pre-charge current may be controlled to be at any level, such as at the peak inductor current level or above, so that the average current supplied during the brief ON-time is enough to provide the target LED current. This may occur if the LED ON-time is less than a single switching cycle of the regulator. If the ON-time is so short that the regulator does not achieve the desired constant LED current throughout the ON-time, even though the pre-charge inductor current matches the inductor current at the end of the PWM-ON-time, the inductor may be over or under-driven during the pre-charge time to higher or lower than the inductor current that existed at the end of the previous ON-time so that the smoothed (or average) current to the LEDs during the short ON-time matches the target ILED. This overdrive loop is controlled by the steps 56 and 58 in FIG. 2 and by the pre-charge adjustment circuit 39 in FIG. 1. So, if ILED is too low, even if the inductor is pre-charging to the same level at the end of the previous ON-time, the overdrive loop increases pre-charge time, causing the inductor pre-charge current to be additionally ramped up to achieve the target ILED. The additional pre-charge current is achieved by pre-charging the inductor for a longer time. The pre-charging time can also be shortened to decrease the pre-charge current if necessary.

Any type of transistor (e.g., bipolar, MOSFET, etc.) or other switching device may be used in the various circuits.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for controlling a regulator for dimming of a light emitting diode (LED) load comprising:
    providing a dimming signal having a duty cycle, the dimming signal controlling an LED ON-time and an LED OFF time, the dimming signal being at a first frequency;
    controlling a regulator to supply current to the LED load during the LED ON-time, and to supply no current to the LED load during the OFF-time, the regulator having an inductor;
    detecting an inductor current during a steady-state condition of the regulator during the ON-time to generate a first value corresponding to the inductor current;
    storing the first value during the OFF-time;
    pre-charging the inductor to a current level related to the stored first value, prior to a next ON-time of the LED load;
    maintaining a control signal in a feedback loop of the regulator substantially constant during the OFF-time; and
    upon the dimming signal designating the ON-time, controlling the regulator to again supply current to the LED load, wherein at a start of the ON-time, the inductor has been pre-charged with a current approximately equal to the inductor current during the steady-state condition of the regulator so that the current supplied to the LED load at the beginning of an ON-time is approximately equal to the current supplied to the LED load at the end of the previous ON-time.

2. The method of claim 1 wherein the step of detecting the inductor current comprises detecting an instantaneous inductor current.

3. The method of claim 1 wherein the step of detecting the inductor current comprises detecting an average inductor current.

4. The method of claim 1 wherein the step of detecting the inductor current comprises detecting both an instantaneous inductor current and an average inductor current, and wherein stored values of both the instantaneous current and the average current during the steady-state condition are compared to currents generated in the regulator during the next ON-time to ensure that the current supplied to the LED load at the beginning and end of the next ON-time is approximately equal to a target LED load current.

5. The method of claim 1 wherein the step of pre-charging the inductor comprises pre-charging the inductor to its steady-state average inductor current during the previous ON-time.

6. The method of claim 1 wherein the step of pre-charging the inductor comprises pre-charging the inductor to its steady-state valley level during the previous ON-time.

7. The method of claim 1 wherein the step of pre-charging the inductor comprises pre-charging the inductor to its steady-state peak inductor current during the previous ON-time.

8. The method of claim 1 wherein the step of pre-charging the inductor comprises pre-charging the inductor to a pre-determined percentage of its steady-state average, peak, or valley inductor current during the previous ON-time.

9. The method of claim 1 wherein the step of detecting the inductor current to generate the first value comprises detecting an instantaneous inductor current,
    wherein the step of pre-charging the inductor to the current level related to the stored first value, prior to a next ON-time of the LED load, comprises pre-charging the inductor to the current level while comparing the pre-charge current level to the current level corresponding to the stored first value, and adjusting the pre-charge timing until the pre-charge current level at the LED ON-time approximately equals the current level corresponding to the stored first value.

10. The method of claim 1 further comprising generating a timing signal for initiating the step of pre-charging the inductor, wherein the timing signal is out of phase with the dimming signal to allow the inductor to be pre-charged prior to the LED ON-time.

11. The method of claim 1 further comprising:
    determining a period of the dimming signal to predict the LED ON-time; and
    performing the pre-charging of the inductor from a time before the predicted LED ON-time up until the LED ON-time.

12. The method of claim 11 further comprising the step of selecting a start of the pre-charging time so that the inductor is pre-charged to the current level at the start of the LED ON-time.

13. The method of claim 1 wherein the regulator further comprises an output capacitor, the method further comprising maintaining a voltage at the output capacitor substantially constant during the OFF-time.

14. The method of claim 13 wherein the step of maintaining the voltage at the output capacitor substantially constant during the OFF-time comprises electrically isolating the output capacitor from any current generator or current drain during the OFF-time.

15. The method of claim 1 further comprising:
    detecting a current to the LED load at an end of the LED ON-time to identify a detected load current;
    comparing the detected load current to a target load current; and
    adjusting a pre-charge time of the inductor so that the detected load current at the end of the LED ON-time substantially matches the target load current.

16. The method of claim 15 wherein the pre-charge current level at the end of the pre-charge time is greater than the detected inductor current at the end of the LED ON-time.

17. A regulator system for dimming a light emitting diode (LED) load comprising:
    a first terminal for receiving a dimming signal having a duty cycle, the dimming signal controlling an LED ON-time and an LED OFF time, the dimming signal being at a first frequency;
    a current regulator controlled to supply a regulated current, under a steady-state condition, to the LED load during the LED ON-time and to supply no current to the LED load during the OFF-time, the regulator having an inductor;

a current detection circuit for detecting an inductor current during a steady-state condition of the regulator to generate a first value corresponding to the inductor current;

a storing circuit coupled to the current detection circuit for storing the first value during the OFF-time;

a pre-charger circuit connected to pre-charge the inductor, during the OFF-time, to a current level related to the stored first value wherein, at a start of the next ON-time, the inductor has been pre-charged with a current approximately equal to the inductor current during the steady-state condition of the regulator so that the current supplied to the LED load at the beginning of the next ON-time is approximately equal to the current supplied to the LED load at the end of the previous ON-time;

a first isolation circuit connected to maintain a control signal in a feedback loop of the regulator substantially constant during the OFF-time; and an enablement circuit for enabling the regulator to supply the current to the LED load during the LED ON-time wherein, at the start of the LED ON-time, the inductor conducts the pre-charged current.

18. The system of claim 17 further comprising a difference amplifier circuit receiving the first value and a pre-charge inductor current value, an output of the difference amplifier circuit controlling a pre-charging time of the inductor so that the pre-charge inductor current value matches the first value.

19. The system of claim 17 wherein the pre-charged inductor current approximately equals the inductor's steady-state average inductor current during the previous ON-time.

20. The system of claim 17 wherein the pre-charged inductor current equals a pre-determined percentage of its steady-state average, peak, or valley inductor current during the previous ON-time.

21. The system of claim 17 further comprising:
an output capacitor; and
a second isolation circuit connected to maintain a voltage at the output capacitor substantially constant during the OFF-time.

22. The system of claim 17 wherein the pre-charger circuit is also configured to detect a current to the LED load at an end of the LED ON-time to identify a detected load current, compare the detected load current to a target load current, and adjust a pre-charge time of the inductor so that the detected load current at the end of the LED ON-time substantially matches the target load current.

23. The system of claim 22 wherein the pre-charge current level at the end of the pre-charge time is greater than the detected load current at the end of the LED ON-time.

* * * * *